Aug. 22, 1961   V. F. DAHLGREN   2,997,521
INSULATED ELECTRIC CIRCUIT ASSEMBLY
Filed April 11, 1960   4 Sheets-Sheet 1

Victor F. Dahlgren
INVENTOR.
BY Robert O. Richardson
Attorney

Aug. 22, 1961    V. F. DAHLGREN    2,997,521
INSULATED ELECTRIC CIRCUIT ASSEMBLY
Filed April 11, 1960    4 Sheets-Sheet 2

Victor F. Dahlgren
INVENTOR.

BY David G. Mick
Attorney

Victor F. Dahlgren
*INVENTOR.*

Aug. 22, 1961  V. F. DAHLGREN  2,997,521
INSULATED ELECTRIC CIRCUIT ASSEMBLY
Filed April 11, 1960  4 Sheets-Sheet 4
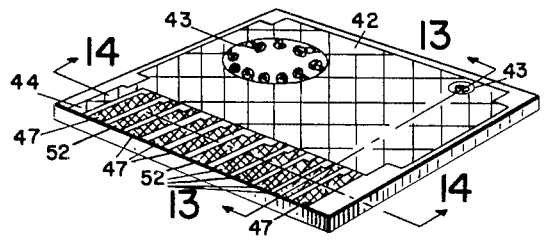
Fig. 11
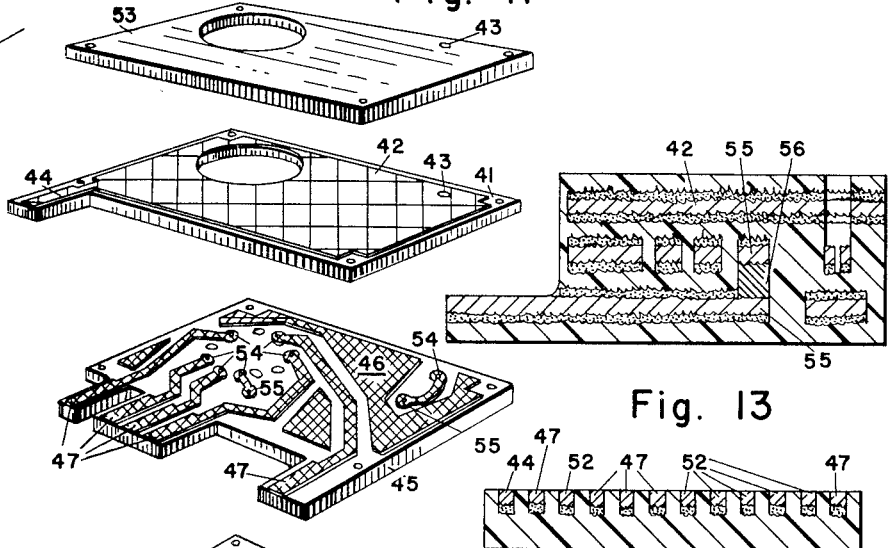
Fig. 13
Fig. 14
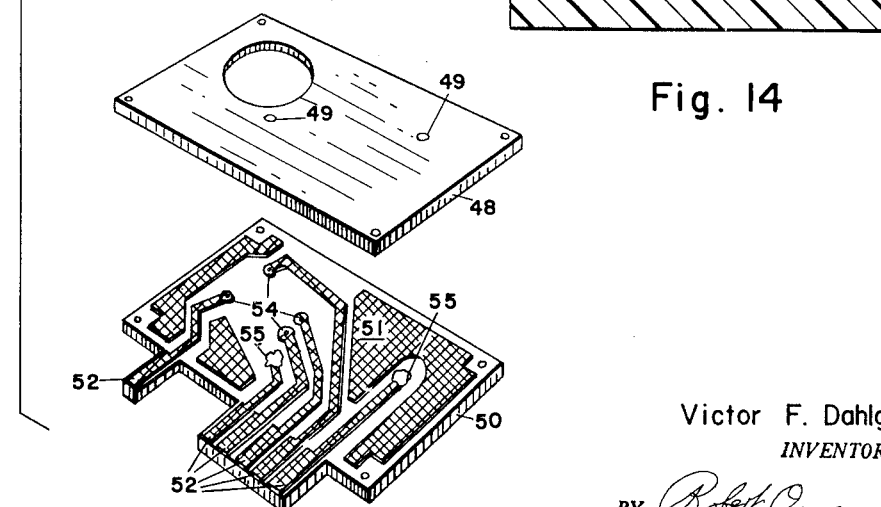
Fig. 12
Victor F. Dahlgren
INVENTOR.
BY Robert O. Richardson
Attorney

United States Patent Office 2,997,521
Patented Aug. 22, 1961

2,997,521
INSULATED ELECTRIC CIRCUIT ASSEMBLY
Victor F. Dahlgren, Nashua, N.H., assignor to Sanders Associates, Inc., Nashua, N.H., a corporation of Delaware
Filed Apr. 11, 1960, Ser. No. 21,272
9 Claims. (Cl. 174—68.5)

This invention relates to an insulated electric circuit assembly in the form of a freely flexible, unitary flat panel which accommodates as an effectively integral portion thereof a plurality of effectively insulated electrical conductors. Such a panel may with great advantage be utilized in place of a group of and distinguished from separate wires held together as a bundle or twisted together in a rope-like structure and called a "cable." Because such a panel of suitable design may be substituted for such a cable, it has sometimes been colloquially called by that name.

The flexible circuit assemblies of this invention represent a significant breakthrough in this field by providing thin, flat, flexible means for connections which can be bent to almost any configuration and installed without other support to make electrical connections with parts which are geometrically separated merely by flexing to fit the intended path and to meet the terminals. They may be connected with one another or between the circuit elements by removable connectors, thereby facilitating the rapid assembly of prefabricated electronic units, or permanent solder connections may be made to appropriate terminals provided in them.

The freely flexible self-supporting assemblies of the present invention are particularly suited for installation requiring repeated flexing, such as between movable parts joined by hinges or springs. For instance they are frequently connected through a backplate, or hinged door on a piece of electronic equipment. By using the flexible assemblies of this invention, the connection is greatly simplified; it may for instance be made in sufficient length that one part can be displaced while leaving the connections intact. The flexible circuit assembly can be connected to the movable part by means of a removable "plug-in" connector, facilitating ready "make-break" connections.

Flexible assemblies are especially practical for installation in areas of changing temperature and humidity, since they are immune to damage by expansion and contraction of the conductors. The conductors are further protected by the insulating covering which seals them off from the deleterious effect of humidity.

An object of the invention is to provide an improved insulated electric circuit assembly which can withstand repeated flexing in its installation.

The electrical conductors of the invention comprise a preformed insulating base and cover of flexible thermoplastic sheet material enclosing a plurality of thin, flat conductors defining the desired circuit. The preformed base and cover are joined together in fact-to-face union in an autogenous weld to form an essentially homogeneous insulating covering for the conductors in the form of a thin flexible panel having parallel and normally flat surfaces, which may be bent to fit any installation requirements. The term "autogenous" as used herein is intended so to modify weld as to exclude the introduction of external materials for uniting the surfaces whether or not actual liquefaction occurs at the interface of junction.

The conductors are situated entirely within and inwardly of the margins of the base and cover. Electrical connections to the conductors are made either by leaving portions of the conductors uncovered by either the base or cover or by cutting away portions of the base or cover to expose the conductors. The conductors may take any preselected suitable configuration. They may lie entirely in the same plane, or in separate parallel planes separated by intermediate layers of insulating material. Any electrical contacts between layers of conductors may be made by leaving suitable apertures in the intervening layer or layers of insulator and allowing solder to flow in the aperture making electrical contact.

In the embodiments of the invention herein disclosed, the thermoplastic base and cover are also bonded to the conductors, thus providing a maximum physical integration of the components and also protection against the penetration of moisture or gases. Only terminals are exposed, and these can be encapsulated after assembly if desired. The bonding technique provides a unified, integral construction and a strong adherence between conductor and insulator. Unlike brittle or stiff-backed "printed circuit" boards, the circuits of this invention, having the conductors firmly bonded to the insulating base and cover, can withstand the effects of mechanical stresses without affecting the arrangement of the conductors within the circuit. Because of the great protection afforded by complete enclosure in thermoplastic material, the assemblies can also withstand a wide range of environmental conditions.

In their preferred embodiments the assemblies of the invention are manufactured by first oxidizing a thin sheet or foil of copper to provide a strongly adherent substantially homogeneous black cupric oxide coating. The sheet of coated copper is placed upon a thin, preformed base sheet of thermoplastic material of approximately equal size. The two layers are heated and pressure is applied to join them together. The amount of heat and pressure will in any particular case depend upon the plastic involved; the heat must be sufficient to soften the plastic enough to bond it to the copper under the applied pressure which may be used concurrently with heating, or may be applied after the layers have been heated sufficiently to soften them. When bonding the copper oxide coated conductor to the base in this manner, an imprint of the copper oxide surface, which is somewhat rough, reflecting the contours of the crystals of which it is composed, is formed in the surface of the plastic.

Conductors of predetermined arrangement may be formed by chemically removing copper in selected areas to leave behind a predetermined conductive pattern on the thermoplastic sheet. Portions of the base surface having the imprint of the copper oxide are thus exposed. A second covering sheet of thermoplastic material is placed over the oxide-coated conductors to protect them and heat and pressure are again applied to the assembly to join, weld or unite the thermoplastic layers at their contacting surfaces and to embed the conductors to form a unified, integral, flexible insulated electric circuit assembly unit. The imprint of the copper oxide on the base surface appears to impart to the base an improved ability to hold the conductors in position during assembly.

Additional layers may be compounded and placed on top of the initial layers. When all the desired layers have been so assembled, heat and pressure are applied to produce a multi-layered integral flexible electrical circuit assembly.

For a better understanding of the present invention, together with other and further objects thereof, reference is made to the following description taken in connection with the accompanying drawings and its scope will be pointed out in the appended claims.

In the accompanying drawings:

FIGS. 3 through 9 are diagrammatic in nature and are not to scale.

FIG. 11 is a perspective view of a multi-laminate insulated electric circuit assembly embodying the invention;

FIG. 12 is an exploded view in perspective of the circuit in FIG. 11;

FIG. 13 is an enlarged, sectional view of the circuit in FIG. 11 taken along the lines 13—13; and FIG. 14 is an enlarged, sectional view of the circuit in FIG. 11 taken along the lines 14—14.

The conductive surfaces are shown cross-hatched herein to distinguish from insulating material.

DESCRIPTION OF CIRCUIT IN FIGS. 1–9

Figure 1:
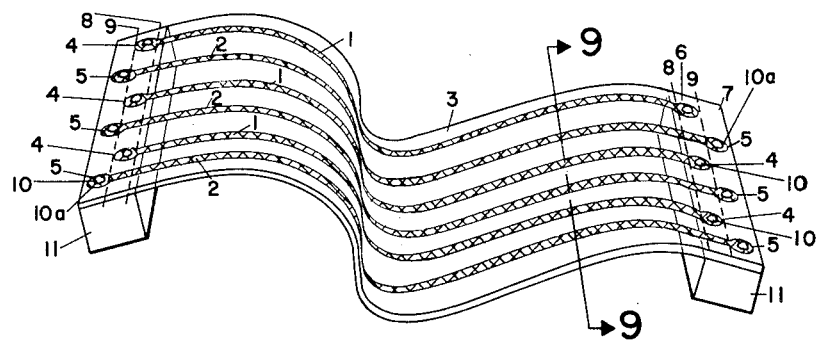
FIG. 1 is a perspective view of an insulated electric circuit assembly embodying the present invention.

The insulated electric circuit assembly of FIG. 1 comprises black cupric oxide coated conductors 1 and 2 sealed between a thermoplastic base and a thermoplastic covering. The base and covering may be sheets of polymonochlorotrifluoroethylene, commercially obtained under the trade name of Kel–F, formerly a trademark of M. W. Kellogg Company but in 1960 became a trademark of Minnesota Mining and Manufacturing Co., or polytetrafluoroethylene, commercially available as Teflon, a trademark of DuPont suitable for use in accordance with the invention will be apparent to those skilled in the art.

The embodiment depicted in FIG. 1 shows conductors having alternate lengths, the shorter conductors 1 being centered relative to the longer conductors 2 to provide staggered terminals 4 and 5 as shown. The dashed lines indicated at 8 indicate the terminations of the top insulating coat 3 of thermoplastic material which covers the shorter cupric oxide coated conductors 1. The dashed lines indicated at 9 determine the extremes of an intermediate insulating layer 6 of thermoplastic material which covers the longer cupric oxide coated conductors 2.

A sheet 7 of thermoplastic material provides the insulating coat for the conductors 2. The terminals 4 and 5 have orifices 10a formed therein through the insulating material. The prongs 10 of the connectors 11 extend through these orifices 10a and are soldered to the terminals 4 and 5.

Figure 2:
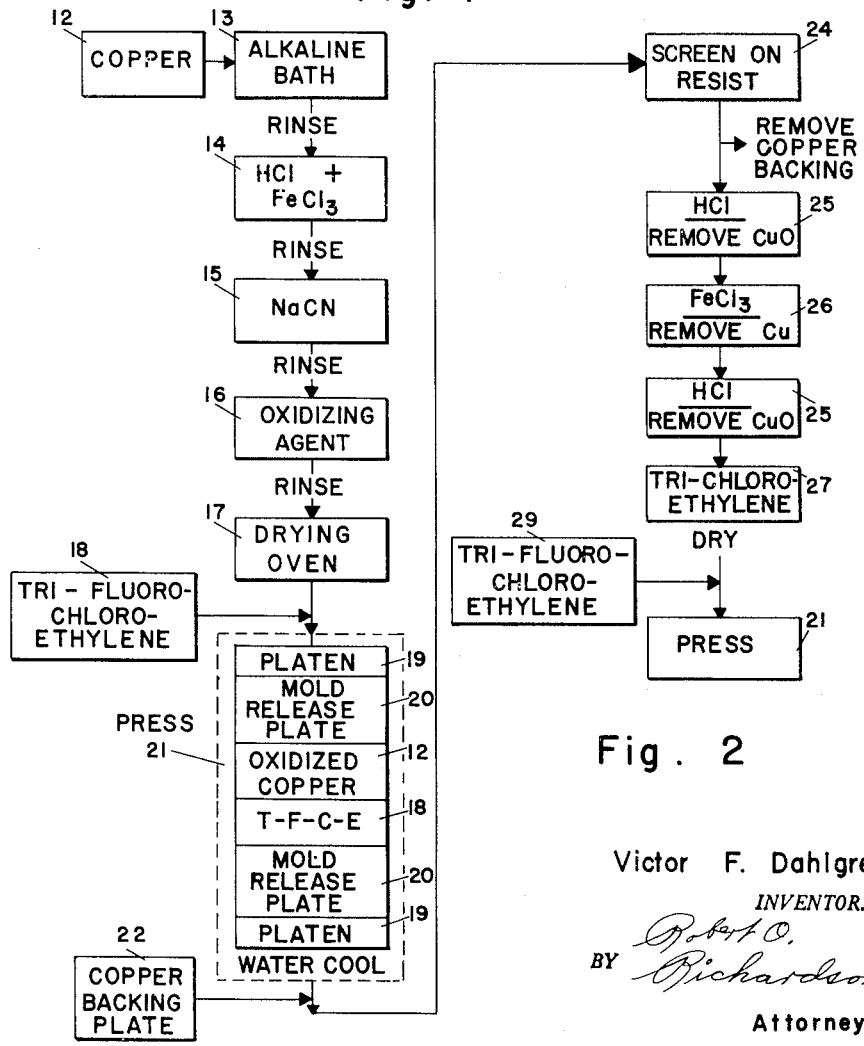
FIG. 2 is a flow chart for the preparation of an insulated electric assembly prepared in accordance with the invention.

Referring to the flow chart of FIG. 2, a preferred process for manufacturing the electric circuit assembly is described in the following example. Kel–F is employed as the thermoplastic insulating material. These copper sheets 12, e.g. .001 in. thick, are immersed for five seconds in a mold alkaline bath 13 such as Dy-Clens EW Cleaner, manufactured by MacDermid, Inc., Waterbury, Connecticut. The excess cleaner is rinsed away under cold, running water for five seconds. The sheets are then dipped for fifteen seconds in a ten percent aqueous solution 14 of hydrochloric acid in which is dissolved eight ounces per gallon of ferric chloride. Excess acid solution is rinsed away under cold, running water for five seconds and the sheets are immersed for fifteen seconds in a ten percent aqueous solution 15 of sodium cyanide which is then also rinsed under cold, running water.

To provide the copper surfaces with a homogeneous black cupric oxide coating, the copper is immersed in a solution oxidizing agent 16 for ten minutes at 190–205° F., for example a water solution of one and one-half pounds per gallon of Ebonol "C" Special manufactured by Enthone Co., New Haven, Connecticut. Ebonol "C" Special consists essentially of an alkali such as sodium hydroxide or potassium hydroxide and an alkali metal chlorite such as sodium chlorite or potassium chlorite, and is described in U.S. Patent No. 2,364,993, issued to Walter E. Meyer. After coating, the copper is immersed in cold, running water and then rinsed in hot, running water for ten to twenty seconds. The copper is finally baked in a preheated oven 17 above 212° F. until all traces of moistures are removed. The black oxide surface as produced in this or by an equivalent manner may be characterized briefly as an adherent coating, being effectively integral with the underlying copper, and is sharply to be distinguished from an oxide coating that has little adhesion to the copper and readily flakes away.

The sheets of cupric oxide coated copper thus formed are bonded to sheets of Kel–F about .005 in. thick in a press 21 having on both of its platens 19 flat mold release plates 20. The press may be of the type manufactured by the Wabash Press Co., Wabash, Indiana. The release plates are preferably formed of fiberglass impregnated with polytetrafluoroethylene (obtained under the tradename of Teflon from DuPont). The press has provisions for heating the platens 19 to a controlled temperature as high as 1000° F., and is adapted to pass water through the platens for cooling. After placing a thin, elongated sheet of Kel–F 18, say eight inches long, two inches wide, and five milli-inches thick, on the lower mold release plate 20 and covering it with a thin sheet of cupric oxide-coated copper 12, eight inches long, two inches wide, and one milli-inch thick, the upper mold release plate 20 is placed upon the coated copper. The platens 19 are compressed to apply five pounds per square inch pressure at a temperature of 216–225° C. for forty to eighty seconds to join or weld together the copper and the Kel–F. The product is water cooled under maintained pressure before removal from the press.

Figure 3:
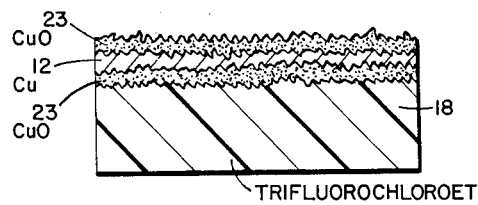
FIG. 3 is an enlarged, sectional view of an oxide-coated copper and thermoplastic laminate.

In FIG. 3 the copper 12 is shown laminated to the Kel–F 18 through the black cupric oxide 23. The cupric oxide is greatly magnified more clearly to illustrate its imprint upon the Kel–F.

Figure 4:
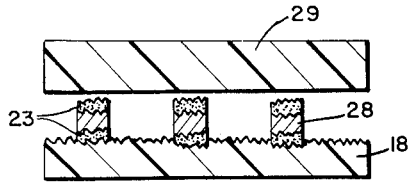
FIG. 4 is an enlarged, sectional view of an etched circuit before applying the cover coat.
Figure 5:
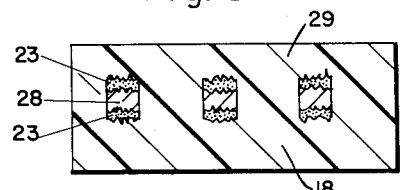
FIG. 5 is an enlarged sectional view of the circuit of FIG. 4 after sealing.

Referring again to FIG. 2, a temporary heat seal between a copper backing plate 22 and the Kel–F sheet 18 is provided to prevent curling. The desired circuit is formed from the copper by the following steps. By a stencil or screen printing process a resist material, for example No. 5512 Vinyl Ink manufactured by Nazdar Co., Chicago 10, Illinois, resistant to and insoluble in the etching solution of ferric chloride and hydrochloride acid is applied to the coated copper in a pattern corresponding to the desired configuration of the conductors. The copper backing plate 22 is removed and the assembly first immersed in a five percent aqueous solution 25 of HCl to remove the cupric oxide coating from the surface not covered by the resist and to expose the copper. The assembly is then immersed in an aqueous solution 26 of FeCl₃ to etch away the exposed copper and finally in a solution 25 of HCl to remove the cupric oxide in the exposed Kel–F and thus provide an imprint of the oxide in the Kel–F. The resist material is dissolved by immersion into an aqueous solution 27 of trichloroethylene before the coated copper conductor clad Kel–F is dried. As shown in FIG. 4, a complete assembly may now be formed by covering the coated conductors 28 with a Kel–F sheet 29. While the same heat, pressure and length of laminating time as in the lamination of the copper to the base is usually satisfactory, it has been found that a variance is sometimes desired, depending upon the conductor widths, conductor spacing, the thickness and type of material of the cover coat. The assembly of the Kel–F sheets and conductors joined under heat and pressure is shown in FIG. 5.

A strong bond between the base sheet and the conductors is assured because of the adherent cupric oxide coating on the latter which is not weakened by repeated flexure. The removal of oxide coated copper between the conductors permits the surfaces of the two insulating sheets to be joined in an autogenous weld. The chemical removal of the cupric oxide from the surface of the base sheet exposes in the plastic surface a negative imprint of the crystalline cupric oxide to provide a minutely roughened surface. The covering sheet, when applied under suitable heat and pressure, intrudes into the spaces between the copper conductors and is plastically molded to the base sheet. The covering sheet tends to flow into the interstices of the imprinted base sheet to form a joint between the two sheets of plastic characterized by an interlocking interface where the weld occurs. This line of weld is diagrammatically shown by a jagged line in FIGS. 5, 6, and 9. The asperities of the minutely roughened surface of the base sheet facilitate the formation of the weld and their presence is believed to contribute to the maintenance of the desired relative spacing of the conductors during the joining process.

Figure 6:
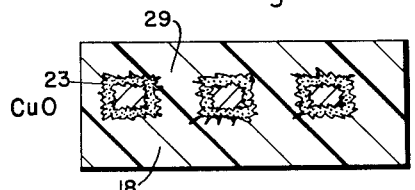
FIG. 6 is an enlarged sectional view of a modification of the circuit of FIG. 4.

By immersing the etched circuit laminate again in the oxidizing bath as described above before sealing to provide an oxide coating on the edge surfaces, the conductors may be completely surrounded with cupric oxide as shown in FIG. 6. This may be desirable in some instances since direct contact of Kel–F to unoxidized copper tends to degrade the Kel–F.

Kel–F and Teflon have outstanding electrical properties and may be considered the preferred choice for the thermoplastic layers. Teflon may have an advantage if the product is likely to be subjected to high temperatures in use. Kel–F may be handled at lower temperatures in the manufacturing process. Other thermoplastics may be used although their pertinent electric properties are of lower value. In some cases thicker sheets may be used. Usually they will be cheaper. In general, the required quality of the product in view of its intended use and expected life will guide the choice. Suitable grades of polyethylene, polyvinyl base plastics, and methyl methacrylate plastics may be utilized in accordance with the process disclosed, suitably modified as to the temperatures used, to produce products exemplifying the invention.

Figure 7:
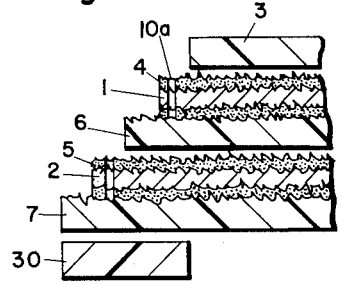
FIG. 7 is an enlarged, exploded, longitudinal, section of the circuit assembly in FIG. 1.
Figure 8:
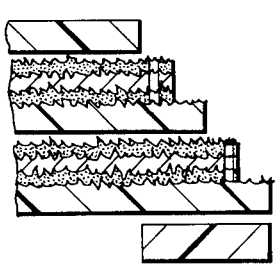
FIG. 8 is an enlarged, transverse section of the circuit in FIG. 7.
Figure 8:
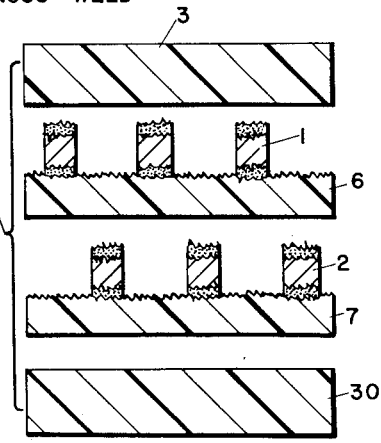
Figure 9:
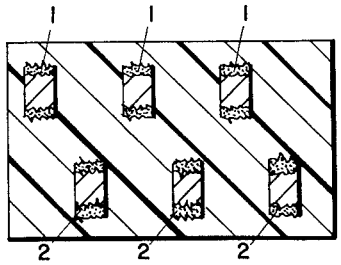
FIG. 9 is an enlarged, sectional view of the circuit in FIG. 1 taken along the lines 9—9.

Referring now to FIGS. 7, 8 and 9, the electric circuit assembly of FIG. 1 may be formed by preparing, in accordance with the process above, a first assembly of oxide coated conductors 1 and Kel–F sheet 6 and a second assembly of oxide coated conductors 2 and Kel–F sheet 7, the first assembly being shorter than the second. The conductors 1 are longitudinally centered relative to the conductors 2 to expose the respective terminals 4 and 5 in staggered disposition as shown in FIG. 8. Two short Kel–F sheets 30 are added beneath the terminal sections to act as stiffeners, and the total assembly is placed in position as shown in FIGS. 7 and 8 and combined by heat and pressure into a composite, flexible unit. A cross section of the assembly is shown in FIG. 9 which illustrates the alternate spacing of the conductors 1 and 2 to provide maximum insulation therebetween. The assembly is then immersed in hydrochloric acid for 10 seconds to remove the cupric oxide from the terminals 4 and 5. Orifices 10a in the terminals 4 and 5 are extended through the Kel–F in a predetermined pattern corresponding with and in register with the external connections to the prongs 10 of the connectors 11 in FIG. 1. The conductors are pressed into place with their prongs 10 extending into the orifices 10a as shown in FIG. 1. The circuit is then solder dipped to form conductive connections between the prongs 10 of the connectors 11 and the conductor terminals 4 and 5 of the circuit. The circuit assembly may be sealed to the connectors 11 and the terminals 4 and 5 soldered to the prongs 10 simultaneously.

Figure 10:
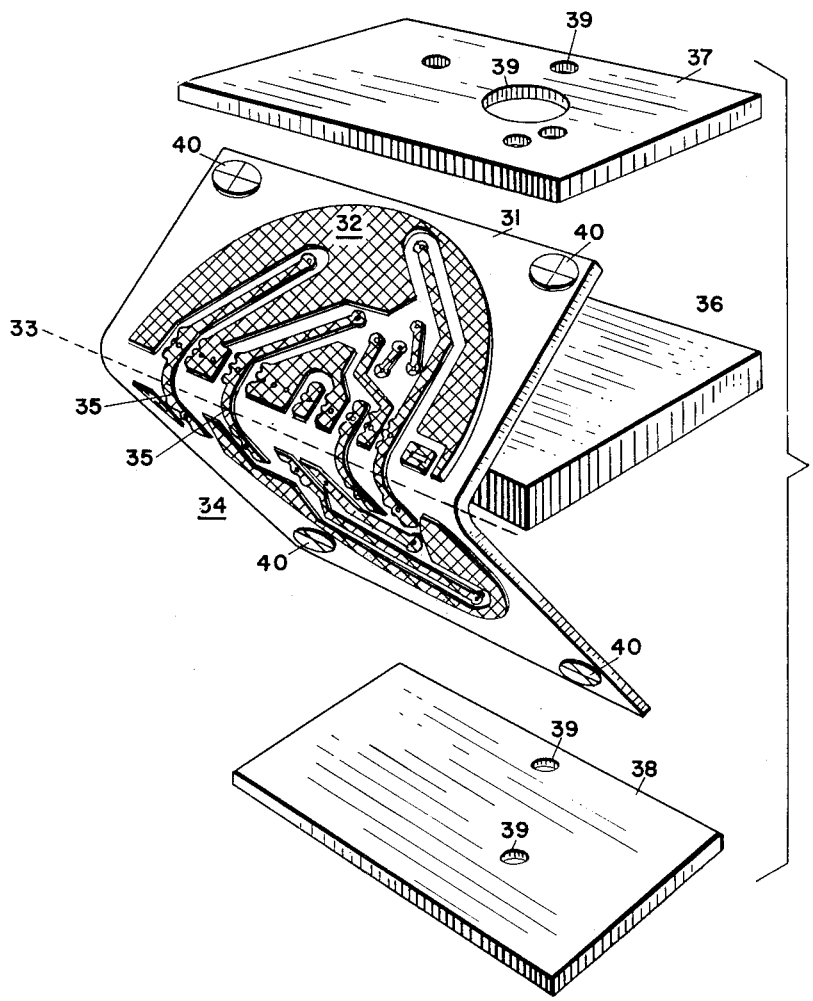
FIG. 10 is an exploded view of another embodiment of the invention.

The embodiment of FIG. 10 illustrates a flexible insulated, electric circuit assembly joined to a stiff material to form a plate. The flexible circuit comprising a first thin thermoplastic insulating sheet 31 bonded to cupric oxide coated copper conductors in a first predetermined conductive pattern generally indicated at 32 above the dashed fold line 33 as shown. The plastic sheet 31 is also bonded to cupric oxide coated copper conductors in a second predetermined conductive pattern generally indicated at 34 below the line 33 as shown. The conductors in the patterns 32 and 34 are connected together by tabs which are folded about a baseplate 36 formed, for example, of Kel–F impregnated fiberglass. A second thermoplastic insulating sheet 37 covers the first conductive pattern 32 leaving the tabs 35 exposed. A third thermoplastic insulating sheet 38 covers the pattern 34, leaving the tabs 35 exposed. Orifices 39 are formed in the plastic sheets to permit external connections to the conductive patterns 32 and 34. Index marks 40 are formed on the sheet 31 to insure proper registration of the orifices and the connection points in the patterns 32 and 34.

The flexible circuit and the baseplate 36 are laminated together to provide a composite, integral electric circuit assembly plate. The flexible circuit assembly surrounds the baseplate 36 as indicated. The plate is immersed in hydrochloric acid to remove exposed cupric oxide and provide clear copper connections. The plate thus formed may be inserted in a suitable female connector to effect electrical connections to the tabs 35. Corresponding internal connection points of the conductive patterns are in register; that is, congruently aligned.

In the embodiment of FIGS. 11, 12, 13 and 14, a flexible electric circuit assembly having a plurality of laminations is illustrated. An insulating sheet 41 of thermoplastic is bonded to a copper sheet 42 to form a first laminate. The copper 42 provides a ground shield for the circuit and is connected to an external connection tab 44. Orifices 43 are formed in the laminate to permit access to the circuits below. A second thermoplastic insulating sheet 45 is bonded to a plurality of cupric oxide coated conductors in a first predetermined conductive pattern as indicated generally at 45. Tabs 47 extend from the conductors to provide external connections. A third insulating sheet of thermoplastic 48 has orifices 49 formed therein to permit internal connections. The orifices are in register with orifices in the sheet 45 permitting access to internal connection points in the conductive pattern 46. A fourth thermoplastic insulating sheet 50 is bonded to cupric oxide coated conductors in a second conductive pattern as indicated generally at 51. The orifices in the sheet 48 register with internal connection points in the conductive patterns 46 and 51 to permit solder connections therebetween. Tabs 52 are connected to the conductors of the second conductive pattern 51. A covering thermoplastic insulating sheet 53 covers the cupric oxide coated copper shield 42 leaving its tab connection 44 exposed.

The sheet 53, copper 42, sheet 41, conductive pattern 46 and sheet 45 are bonded and joined together to provide a first laminate. Similarly, the sheet 48, conductive pattern 51 and sheet 50 are bonded and joined together to provide a second laminate. The two laminates thus formed are immersed in hydrochloric acid to remove cupric oxide from the exposed surfaces of the tabs 44, 47 and 52, the external connection points 54 and internal connection points 55 in the patterns 46 and 51. The internal connection points are tinned with a thin coating of solder. The laminates are then sealed together in accordance with the process above to provide the composite, electric circuit of FIG. 11 and simultaneously to provide fused solder inter-connections between the conductive patterns 46 and 51. The tabs 44, 47 and 52 are co-planar and parallel as shown in FIGS. 11 and 14. In FIG. 13 an internal connection between the points 55 in the patterns 46 and 51 is illustrated with the solder 56 therebetween.

The present invention presents an important step forward in the art of electric circuits. To mention just a few of the many applications of this invention, the circuits may be used as "cables" or harnesses for interconnecting assemblies and components of electronic systems, as "cables" and harnesses for computer racks and as interconnecting cables for computer panels and packages, as lightweight "cables" in computer search carriages, rotating antennas, and reciprocating heads on machines, elevators and missile launchers, to save space and prevent jamming of sliding drawers and drop panels which have electronic circuits attached to them, for telephone, telegraph, and industrial switchboards, for relays, motor panels, chemically inert "cables," for wiring of dashboards on automobiles, aircraft, missiles, electrical appliances, and a host of other uses.

While there has been hereinbefore described what are at present considered preferred embodiments thereof, it will be apparent that many and various changes and modifications may be made with respect to the embodiments illustrated, without departing from the spirit of the invention. It will be understood, therefore, that all such changes and modifications as fall fairly within the scope of the present invention, as defined in the appended claims, are to be considered as a part of the present invention.

This application is a continuation in part of applicant's copending applications, Serial No. 509,364, filed May 18, 1955, Serial No. 459,841, filed October 1, 1954 and Serial No. 598,170, filed July 16, 1956. Certain physical features are illustrated in a somewhat different environment in my copending application, Serial No. 507,032, filed May 9, 1955, now Patent No. 2,932,599.

What is claimed is:

1. An electric circuit assembly providing for a plurality of predetermined electrically conducting paths and as a whole having the form of a preformed freely flexible effectively integral thin panel having a width and length many times its thickness and over-all dimensions suitable for a given application, the panel comprising a base of resinous thermoplastic insulating material normally difficult to bond to itself and selected from a group consisting of polymonochlorotrifluoroethylene and polytetrafluoroethylene, a plurality of relatively spaced thin flat conductors arranged to define said electrically conducting paths on the face of the base and individually and as a group being received inward of the margins thereof, and a cover of resinous thermoplastic insulating material the same as the base superposed on the base, intruding into the areas between and around said conductors and bonded to the base in an interlocking autogenous weld of the materials of said base and cover.

2. An electric circuit assembly providing for a plurality of predetermined electrically conducting paths and as a whole having the form of a preformed freely flexible effectively integral thin panel having a width and length many times its thickness and over-all dimensions suitable for a given application, the panel comprising a base of resinous thermoplastic insulating material normally difficult to bond to itself and selected from a group consisting of polymonochlorotrifluoroethylene and polytetrafluoroethylene, a plurality of relatively spaced thin flat conductors of copper foil arranged to define said electrically conducting paths on the face of the base and individually and as a group being received wholly inward of the margins thereof, and a cover of resinous thermoplastic insulating material superposed on the base, intruding into the areas between and around said conductors and bonded to the base in an interlocking autogenous weld of the materials of said base and cover, the conductors having surfaces of adherent black copper oxide effectively integral therewith to which the base and cover are directly bonded.

3. The electric circuit assembly of claim 2 wherein the base and cover are trifluorochloroethylene.

4. The method of making a preformed freely flexible electric circuit assembly unit having at least one predetermined electrically conducting path comprising placing a sheet of copper having an adherent, effectively integral surface coating of black cupric oxide formed thereon against the surface of a flexible base of resinous thermoplastic material with said oxide coating in contact with said material, applying sufficient heat and pressure to bond said sheet to said base, dissolving away portions of said sheet and its coating to form a predetermined electrically conductive path and to expose areas of the surface of said base having thereon an imprint of the surface texture of said cupric oxide, placing a covering of substantially similar flexible thermoplastic material as said base over said base and conductive path and applying heat and pressure to cause said covering to flow into exposed areas of said base to effect a bond of the surface of said covering to the imprinted surface of the exposed areas.

5. An electric circuit assembly providing for a plurality of predetermined electrically conducting paths and as a whole having the form of a preformed freely flexible effectively integral thin panel having a width and length many times its thickness and over-all dimensions suitable for a given application, the panel comprising a base of resinous thermoplastic insulating material having a roughened texture on the face thereof, a plurality of relatively spaced thin flat conductors arranged to define said electrically conducting paths on said roughened textured face and bonded thereto, and a cover of substantially similar resinous thermoplastic insulating material superposed over said conductors and bonded to said roughened textured face in an interlocking autogenous weld of said material.

6. The electric circuit assembly defined by claim 5 wherein the resinous thermoplastic material is trifluorochloroethylene.

7. An electric circuit assembly providing for a plurality of predetermined electrically conducting paths and as a whole having the form of a preformed freely flexible effectively integral thin panel having a width and length many times its thickness and over-all dimensions suitable for a given application, the panel comprising a base of resinous thermoplastic insulating material, a plurality of thin flat copper conductors arranged to define said electrically conducting paths, said conductors having on their broad faces an adherent, effectively integral layer of black copper oxide to which the surface of said base is directly bonded, the surface of said base in areas unoccupied by said conductors having a texture corresponding to the imprint of said layer of black copper oxide, and a cover of substantially similar resinous thermoplastic insulating material superposed over said conductors and bonded to said textured face in an interlocking autogenous weld of said material.

8. The electric circuit assembly defined by claim 7 wherein the resinous thermoplastic material is trifluorochloroethylene.

9. The method of making a unitary electrical conductor element for electrical apparatus having as a whole the form of a freely flexible sheet and providing a plurality of relatively isolated conducting paths comprising the following steps: oxidizing the surfaces of a sheet of copper foil to provide adherent, effectively integral coatings or black cupric oxide, positioning the foil with one of said faces in contact with a flexible sheet of thermoplastic resinous insulating material and by heat and pressure causing the sheet to bond to the adjacent oxide coating, removing a portion of the copper and its oxide coatings in a predetermined pattern which leaves behind a plurality of conducting strips spaced from one another and firmly adhered to the face of the sheet in their relative positions and as a group located inwardly of the margins of the resinous sheet with portions of the latter sheet having an imprint of the surface texture of said cupric oxide exposed between the strips and surrounding the group, covering the said sheet and the adherent metal with a second flexible sheet of thermoplastic resinous material and by heat and pressure causing the material of the second sheet to intrude into the spaces between the sheets and the space around the group to provide an autogenous weld of plastic surfaces throughout the areas and also bonding the second sheet to the oxide coating on the opposed face of the strips.

References Cited in the file of this patent

UNITED STATES PATENTS

| | | |
|---|---|---|
| 1,954,403 | Daly | Apr. 10, 1934 |
| 2,745,898 | Hurd | May 15, 1956 |
| 2,768,923 | Kepple et al. | Oct. 30, 1956 |
| 2,876,393 | Tally et al. | Mar. 3, 1959 |
| 2,932,599 | Dahlgren | Apr. 12, 1960 |

FOREIGN PATENTS

| | | |
|---|---|---|
| 753,875 | Great Britain | Aug. 1, 1956 |